Figure 5:
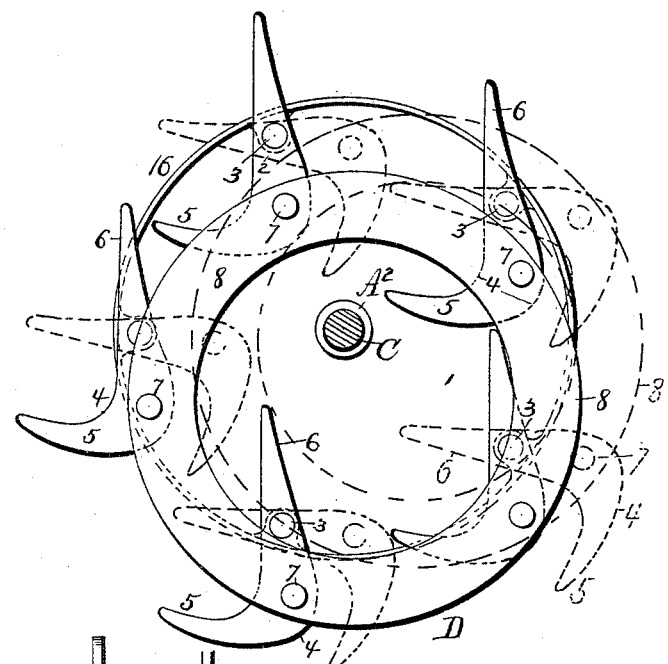

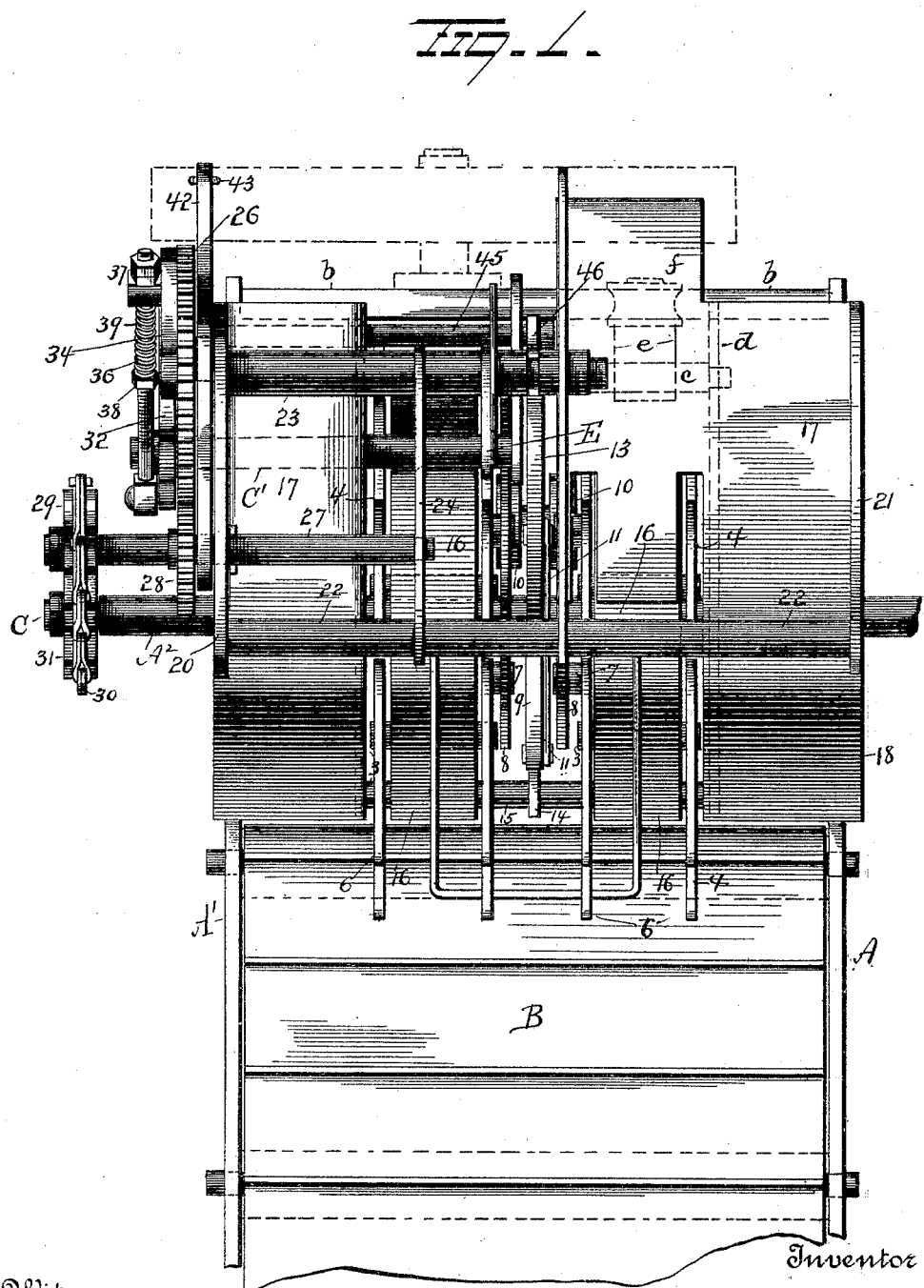

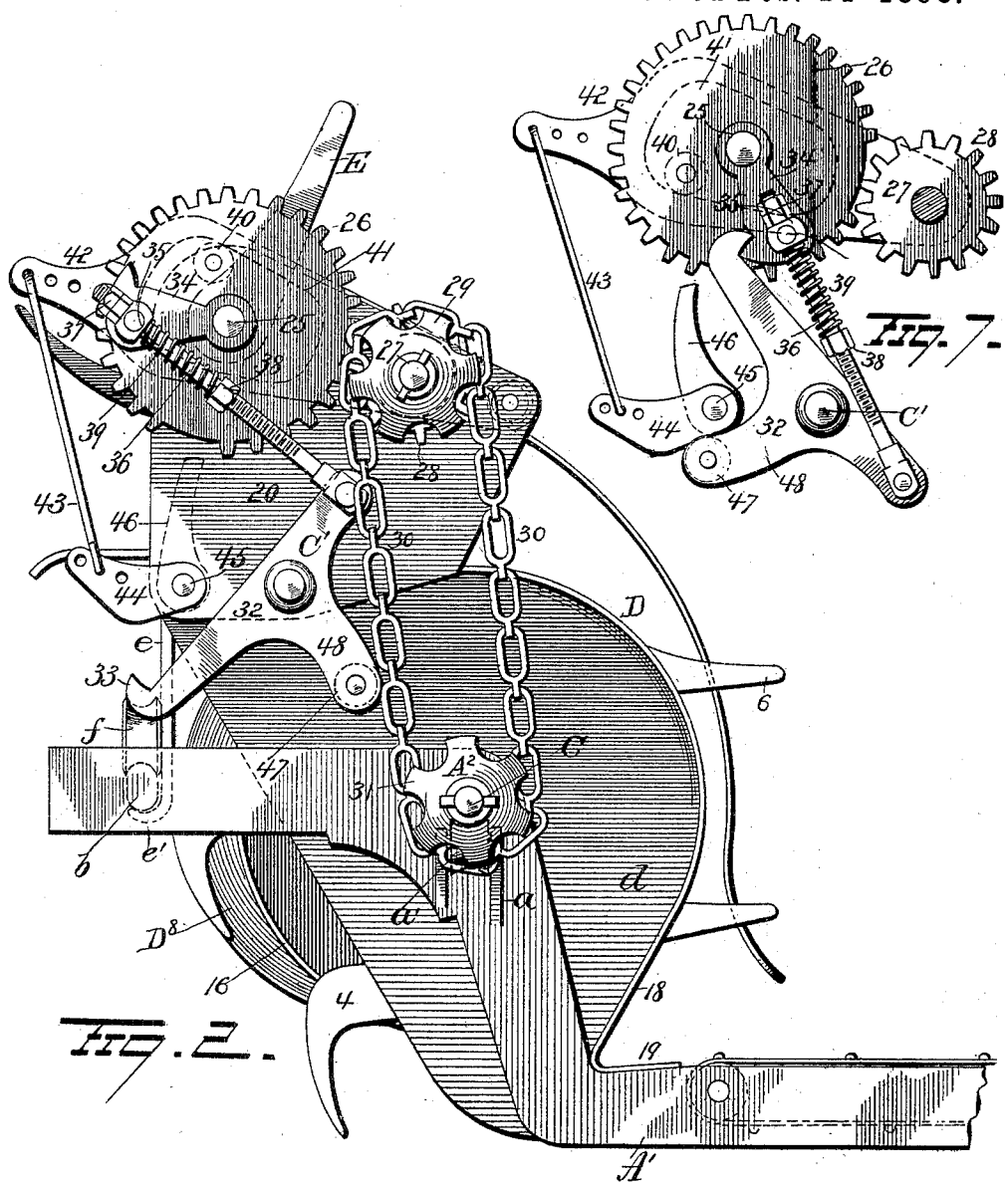

(No Model.) 5 Sheets—Sheet 3.
A. GARDNER.
GRAIN BINDING HARVESTER.
No. 491,641. Patented Feb. 14, 1893.
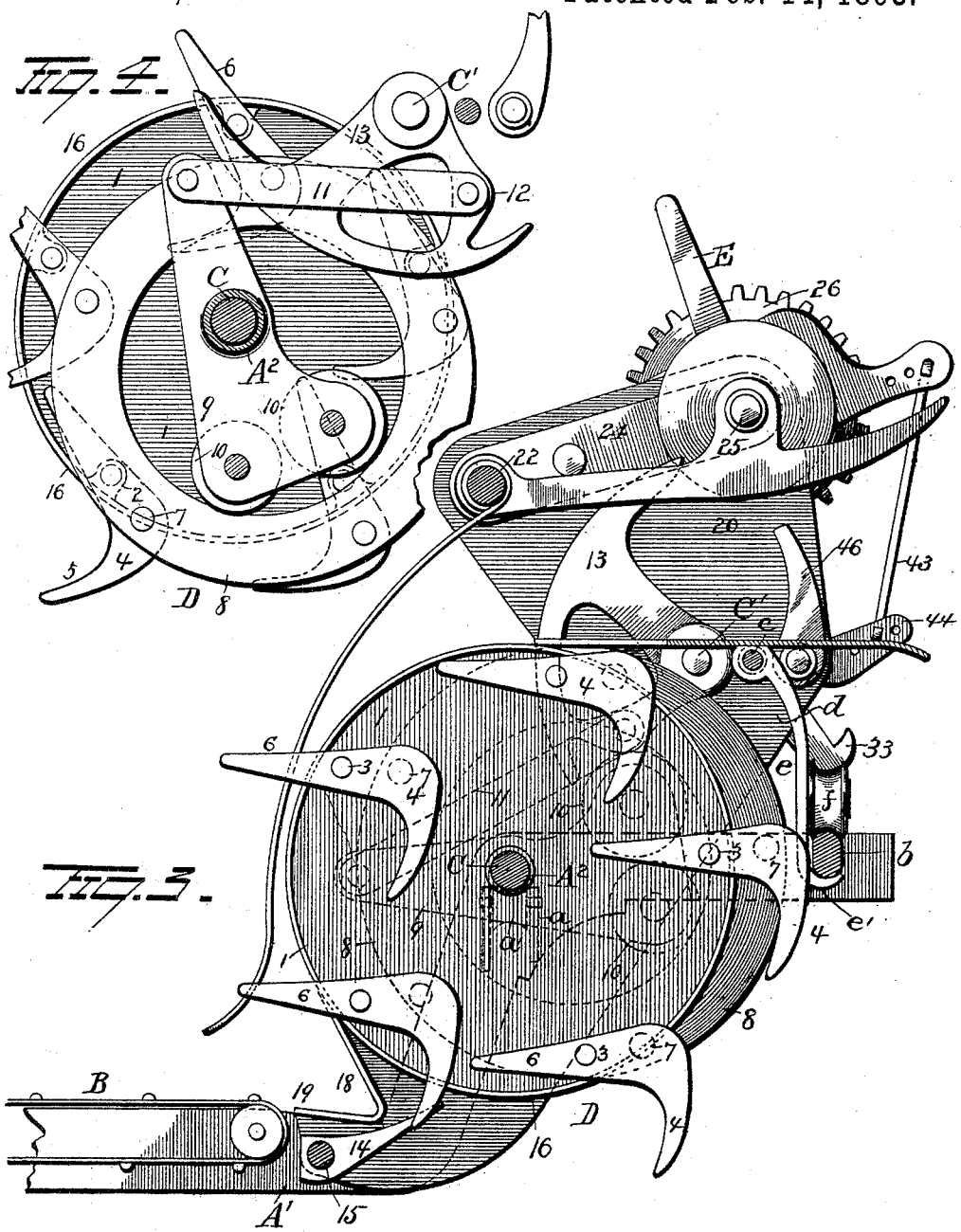
Witnesses
Inventor
A. Gardner
Attorney (No Model.) 5 Sheets—Sheet 4.

A. GARDNER.
GRAIN BINDING HARVESTER.

No. 491,641. Patented Feb. 14, 1893.

(No Model.) 5 Sheets—Sheet 5.
A. GARDNER.
GRAIN BINDING HARVESTER.
No. 491,641. Patented Feb. 14, 1893.
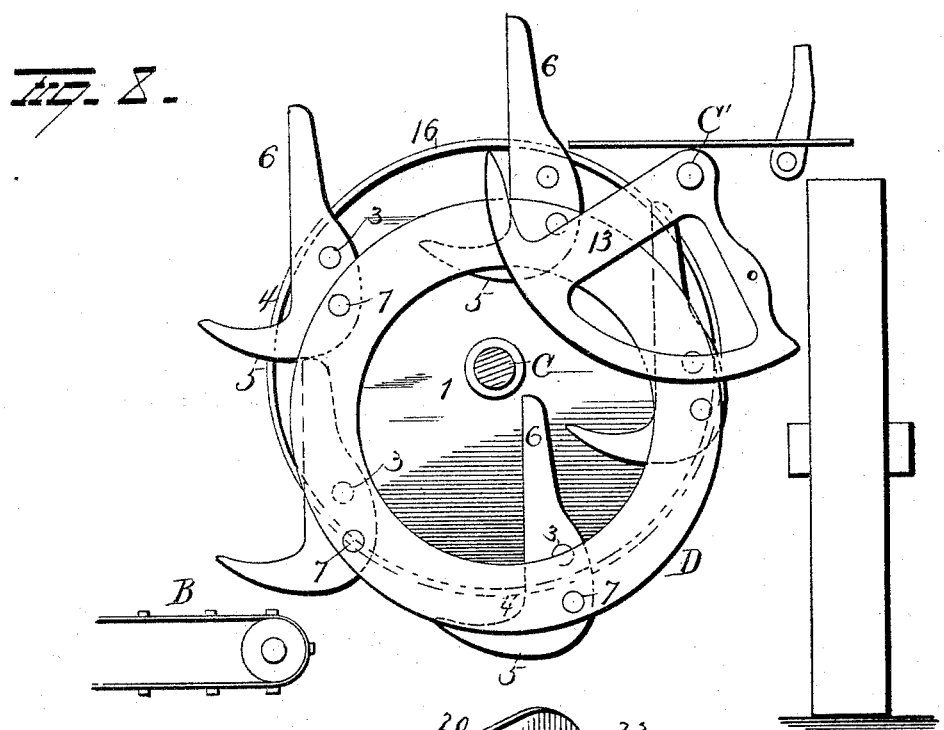
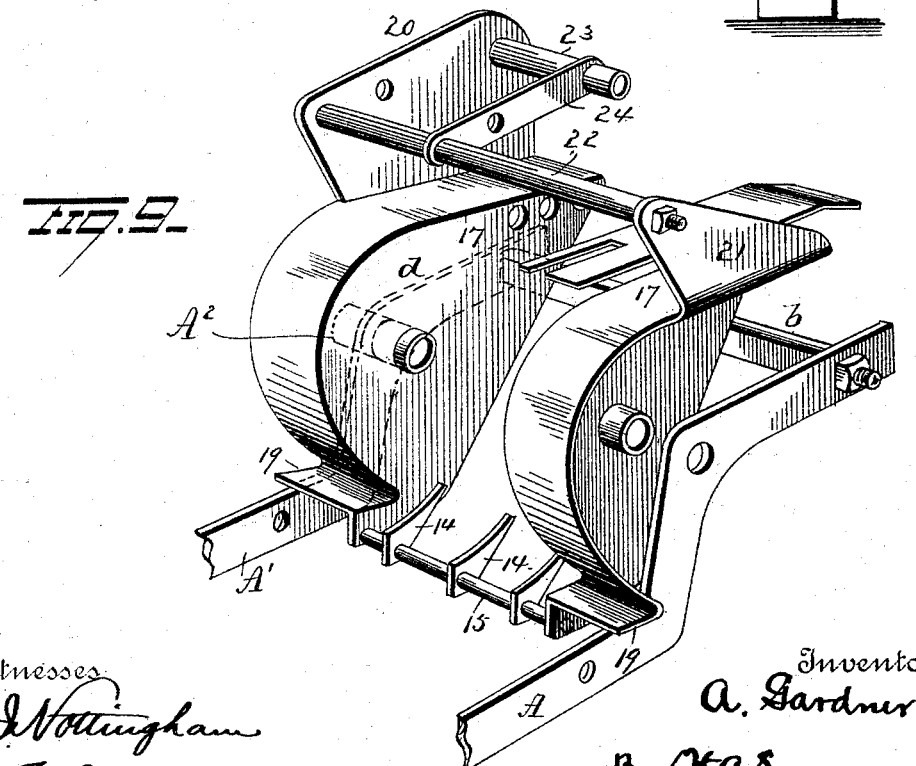
Witnesses
E. J. Nottingham
G. F. Downing
Inventor
A. Gardner
By H. A. Seymour
Attorney

UNITED STATES PATENT OFFICE.

ANDREW GARDNER, OF ATLANTIC, IOWA.

GRAIN-BINDING HARVESTER.

SPECIFICATION forming part of Letters Patent No. 491,641, dated February 14, 1893.

Application filed March 15, 1892. Serial No. 424,989. (No model.)

*To all whom it may concern:*

Be it known that I, ANDREW GARDNER, a resident of Atlantic, in the county of Cass and State of Iowa, have invented certain new and useful Improvements in Grain-Binding Harvesters; and I do hereby declare the following to be a full, clear, and exact description of the invention, such as will enable others skilled in the art to which it appertains to make and use the same.

My invention relates to an improvement in grain binding harvesters.

Heretofore has been proposed,—a revolving rake comprising loosely mounted shafts provided with two sets of teeth extending approximately at right angles to each other and means for maintaining them in approximately horizontal and vertical positions or inclined backward. With such construction it is necessary to set the rake low enough so that its periphery will extend somewhat below the level of the platform conveyer, because the horizontal teeth do not come into operative position to receive the grain, until they have passed a considerable distance beyond the central or lowest point of the rake, from whence they follow an upward curved path.

The object of my present invention is to provide means for overcoming these objections, and to improve and perfect the construction of the machine.

With these objects in view the invention consists in certain novel features of construction and combinations and arrangements of parts as hereinafter set forth and pointed out in the claims.

In the accompanying drawings: Figure 1 is a plan view. Fig. 2 is a view in front elevation. Fig. 3 is a transverse vertical section.
Figs. 4, 5, 6 and 7 are detail views: Fig. 8 is a view of certain parts in rear elevation showing the relative arrangement of the platform conveyer, the rake and the wheel, and Fig. 9 is a detached view in perspective of the rake frame.

A, A' represent the rear and front end bars of the harvester frame, which support the platform conveyer B between them. The outer ends of the bars A A' are extended upwardly and outwardly and serve to support the elevating and binding mechanism. A shaft C is mounted at or near the rear end in the bar A and at or near its forward end in a sleeve $A^2$, which latter is mounted in the front end bar A'. If desired a sleeve $A^2$ may be provided at each end of the machine, said sleeves being secured to uprights which support the binding mechanism. The shaft C and sleeve $A^2$ pass loosely through the perforations in the bars of the harvester frame A, A', so that they may slide through said perforations. A bracket $a$ projects from the bar A' and carries the anti-friction roller $a'$, on which the sleeve $A^2$ is adapted to run. A bar or rail $b$ is secured between the bars A, A' at the outer side of the machine. A rod $c$ is secured to the standards $d$ which support the operating parts of the machine, and secured to the rod $c$ is a bracket $e$ having a lip $e'$ at its lower end, which projects under the rail or bar $b$. A roller $f$ is mounted on a pin projecting from the bracket $e$ and is adapted to run on the rail $b$. From this construction it will be seen that the entire operating mechanism can be readily moved or shifted laterally to bring the rake or elevating mechanism in proper position relatively to the conveyer platform, so that said mechanism can be readily adjusted to operate upon or elevate grain having stems of different lengths,— the rake being thus always adapted to take up the grain at points centrally between its ends.

Mounted on the shaft C are two rake sections D, D. Each rake section comprises a central support 1 secured upon and adapted to rotate with the shaft C and provided at or near the periphery with a series of bosses or bearings 2, which project at their ends beyond the faces of the support 1, and carry a series of short shafts 3. Secured to the ends of each shaft 3, are teeth 4, so formed as to provide in each, a depending hook 5, a vertical tooth 6 and, with a wrist pin 7 at the heel, a crank arm for controlling the position of the hooks and teeth. Eccentric rings or plates 8, provided with perforations for the reception of the wrist pins 7, connect the teeth in series.

A rocker plate or vibrating device 9, provided on each side with bearing surfaces or anti-friction rollers 10, is loosely mounted on the central rake shaft C and placed centrally between the two rake sections, so that the rollers bear against the rings 8 of the adjacent sections. The upwardly projecting end of this rocker plate 9, is connected by a link 11 with an outwardly and downwardly projecting part 12 of the needle 13, which latter is carried by a shaft C', and preferably swings between the two sections of the rake and in the same vertical plane as the rocker plate 9, whereby, as the needle is rocked forward to bind a bundle the teeth of both sections are simultaneously rocked backward to separate the incoming grain from the bundle.

Figure 6:
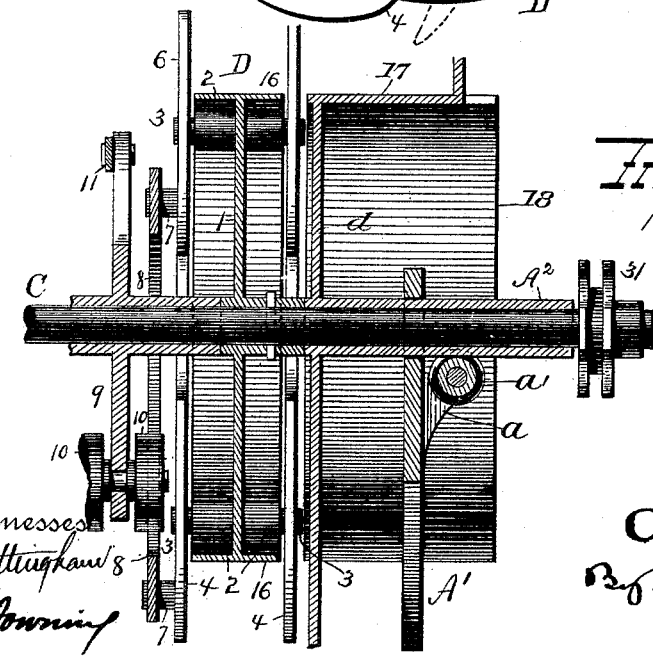

It will be seen that in lieu of the horizontal teeth as heretofore employed, I substitute depending hooks maintained at a sufficient distance below their supporting shafts to adapt them to picking up grain below the periphery of the rake, as shown in Fig. 6. By combining these depending hooks with vertical teeth and providing means, substantially as described, for maintaining both the hooks 5 and the teeth 6 in the same positions throughout their rotation, the rake is made to elevate the grain a greater distance than its own diameter. This construction adapts the rake to be raised above the level of the platform conveyer, and the latter to extend well under the rake, because the depending hooks 5 following a path below the periphery of the rake, come into position to receive the grain when at nearly the central or lowest point in their path. Besides, when rocked from their normal position, these depending hooks recede from the platform conveyer, leaving space for the grain to accumulate, and do not project below other parts of the harvester. In order to provide greater space for the grain to accumulate while a bundle is being bound, a series of fingers 14 is provided, said fingers being secured to a cross bar 15 supported in the standards d, below the conveyer platform. The fingers will be maintained in an approximately horizontal position and project outwardly from adjacent to the platform conveyer under the rake. The rake is also provided with bands 16 which encircle the supports 1, between the teeth, and serve for supporting grain. By this means the space beneath the rake will be left clear for receiving grain.

In order to reduce the length of the rake and render the mechanism more compact, simple and less expensive, and at the same time accommodate the machine to long as well as short grain, I provide the front and rear standards d with flanges or offsets 17 at or near a level or in alignment with the top of the rake, and I also provide projecting strips or flanges 18 extending inwardly and curved downwardly from said flanges or offsets 17 to conform to the periphery of the rake, which curved plates or flanges 18 terminate in horizontal lips 19 adjacent to the platform conveyer. These flanges 17, extending horizontally outward also provide the front and rear parts of the binder table, the central part of the binder table being supported both by the cross bar of the rake frame and the front and rear standards d. Thus the binder table represents a tangent from the central or highest point of the rake, extended horizontally out over the driving wheel.

The operation of the mechanism presently explained for throwing the binding mechanism into operation, may be effected by the back pressure of accumulated grain on the rake teeth, but to insure more perfect action of the means employed for this purpose, and further, to insure greater certainty of starting the binding mechanism at the proper time, is the object of certain improvements which will now be explained.

Projecting upwardly from the binder table or deck, or more properly speaking, from the flanges or offsets 17, are brackets 20, 21, held properly braced and spaced apart by means of a bar 22. A sleeve 23 projects rearwardly from the bracket 20 and is connected with the rod or bar 22 by means of a part or bar 24. A shaft 25 is mounted in the sleeve 23 and carries at or near one end, an ejector E, and at its other end a mutilated gear wheel 26. A shaft 27 is mounted in the bracket 20 and bar 24 and carries a pinion 28 adapted to mesh with the mutilated gear wheel 26. The shaft 27 also carries a sprocket wheel 29, over which a drive chain 30 passes, said drive chain also passing over a sprocket wheel 31 carried by the rake shaft C. A lever 32 is carried by the end of the needle shaft C', said lever having a hook 33 with a curved inner face, adapted to engage a similarly curved face or edge of a lug or plate 34 carried by the mutilated gear wheel. A lug 35 is pivoted to and projects from the lug or plate 34 and is perforated for the passage therethrough of a pitman 36, screwthreaded at its end for the reception of a nut 37 and at a point between its ends for the reception of a nut 38, the lower end of said pitman being pivotally connected to the lower end of the lever 32. Between the lug 35 and the nut 38 a spring 39 is made to encircle the pitman 36. A lug 40 projects from the inner face of the mutilated gear wheel and enters a slot 41 in a cam lever 42, which latter is loosely mounted on the shaft 27. A rod 43 is connected at one end to the free end of the cam lever 42 and at the other end to an arm 44 carried by a shaft 45, on which shaft a trip finger 46 is secured, said arm 44 being adapted to bear on an antifriction roller 47 carried by an arm 48 of lever 32. From this construction and arrangement of parts it will be seen that the pitman 36, is provided with a spring, whereby it is made yielding in length and is adjustable to slightly greater length than is required to reach the wrist pin when the parts are at the "dead center" and the mutilated portion of the gear wheel 26 is so placed with reference to the pitman 36 that the gear wheel is revolved by being in mesh with the constantly moving pinion 28 until the pitman is carried slightly past the "dead center," being allowed to pass the dead center by slightly yielding in length, when the recoil of the spring 39 on the pitman 36 moves the gear wheel slightly further until it is carried entirely out of mesh with the pinion and is locked from turning farther by the engagement of the hook shaped arm 33 with the lug or plate 34 on the wheel 26. With this construction it is intended that the spring before mentioned, on the pitman 36 should afford a yielding support for the rake teeth and to this end it is desirable that the tension of said spring should be so used as to exert a constantly increasing pressure up to the point where the hook 33 and plate or lug 34 become disengaged and the gear wheel 26 is left free to turn. To this end the bearing surfaces of the hook 33 and the plate or lug 34 are formed in the arc of a circle (as above alluded to), the center of which is the pivotal or supporting point of the lever 32, whereby the same distance is maintained from the supporting point at any point of engagement of the hook 33 and the plate or lug 34. By this means the gear wheel 26 is held stationary and the pitman 36 made to yield in length until the hook 33 and plate 34 become disengaged and the gear wheel is left free to turn by the force of the recoil of the spring on the pitman until it passes the space where the teeth are removed and it comes into mesh with the constantly moving pinion.

In order to insure the starting of the binder with greater certainty I have provided the means above described, whereby the impact of the grain against the tripping finger is made to operate conjointly with the impact of the grain against the rake teeth. The means employed to accomplish this end consist in the outwardly projecting arm 48 of the lever 32 attached to the needle shaft, said arm being preferably provided with the anti-friction roller 47. The projecting end of the trip-shaft 45 is provided with the arm or lever 44 as above described, which, in its normal position rests on the outwardly projecting arm 48 of the lever 32, whereby, as the grain presses against the trip lever, causing it to turn outwardly the needle shaft is slightly rocked until the hook 33 and plate 34 become disengaged. By this construction the trip lever or finger is yieldingly supported in its normal position by the same spring on the pitman which furnishes a yielding support to the rake teeth and the impact of grain against both trip and teeth act conjointly to throw the binding mechanism into gear. By the combination of parts as thus described the rake teeth bearing indirectly against the spring on the pitman are held firmly in a yielding position, while the trip, acting directly against the spring, yields as it should, with comparative ease, because the impact of the grain against it is an indirect force. Thus both the trip and teeth act with equal force to start the binding mechanism and provide for starting it at the proper time with greater certainty than either could alone.

From the above description of the machine it will be seen that one of the important improvements consists in making the "hook" portions of the teeth of the rake, depending,— or suspending them below the shafts which constitute their support. By this means a smaller rake is required to elevate the grain because the "hook" portions of the teeth reach below the periphery of the rake. Besides, as heretofore proposed the "hook" portions of the teeth when rocked from their normal position extend below the platform so far as to nearly touch the ground. By the improvements the pivotal or turning point (the tooth shaft) is placed above the level of the platform and the teeth, when rocked from their normal position do not extend below the platform.

Another great advantage gained by my improved construction of the rake is that the points of the "hook" portions of the teeth, in the normal position of the tooth, follow a path having a constantly increasing radius (relative to the center of the rake) up to a certain point. With depending teeth the point of greatest radius comes where the teeth approach the platform conveyer, from whence they retract when rocked from their normal position until they follow a path of so short radius as to run clear of the cradle and thus allow the grain to accumulate in the cradle while a bundle is being bound. With the teeth extending directly from the shaft, the points, as they approach the platform conveyer, follow a path of greater radius when rocked back than when in their normal position, thus shoving the grain out of the cradle and out onto the platform conveyer; this defect is corrected by my improved construction as above explained.

Having fully described my invention what I claim as new and desire to secure by Letters Patent is:

1. In a rotary rake for grain binding harvesters, a series of hook shaped teeth pivotally supported at a point between the bend and one end whereby both ends of the teeth are free, substantially as set forth.

2. In a rotary rake for a grain binding harvester, a tooth having a vertical portion and a hook-shaped portion, said tooth being pivotally supported at a point above the juncture of the vertical and hook-shaped portions and away from the end, substantially as set forth.

3. In a rotary rake, the combination with loosely supported shafts, of hook-shaped teeth secured to these shafts at points between their ends and the angles formed between the two parts of the teeth, substantially as set forth.

4. In a rotary rake for grain binders, the combination with one or more hook-shaped teeth pivotally supported at a point between the ends whereby both ends are free, of a plate or plates pivotally connecting these teeth approximately at the angle formed between the ends, substantially as set forth.

5. In a rotary rake for a grain binding harvester, the combination with teeth having a vertical and a hooked shaped portion, said teeth being pivotally supported at points above the juncture of said portions of the teeth, and an eccentric ring connected to said teeth below their pivotal support, substantially as set forth.

6. In a rotary rake for grain binding harvesters, the combination with a support, of shafts loosely mounted therein and hook-shaped parts secured to the shafts at points between their ends forming a tooth at each end for engaging the grain, substantially as set forth.

7. The combination with revoluble supports, of shafts loosely mounted in the latter, hook-shaped teeth secured to the ends of the shafts at points between the ends of the hooks, and means whereby the teeth are made to point in the same direction during the entire revolution of the rake, substantially as set forth.

8. The combination with a support, of shafts carried thereby, rake teeth on the ends of these shafts, and annular rings loosely connected with the teeth on one end of the shafts, substantially as set forth.

9. In a rotary rake for a grain binding harvester, the combination with a shaft two central supports mounted thereon, of rake teeth suspended from the peripheries of said central supports, eccentric rings pivotally connected to the teeth on the inner ends of the shafts, and means for shifting both of said rings simultaneously, substantially as set forth.

10. In a rotary rake for a grain binding harvester, the combination with two central supports, of a series of shafts carried by each central support, depending hook-shaped teeth carried at each end of each shaft, eccentric rings pivotally connected with each inner series of teeth and means for shifting both eccentric rings simultaneously, substantially as set forth.

11. In a rotary rake for a grain binding harvester, the combination with two central supports, of a series of shafts carried by each central support, depending hook-shaped teeth carried at each end of each shaft, eccentric rings pivotally connected with each inner series of teeth, a rocker plate, and rollers carried by said rocker plate, one roller being adapted to run on the inner edge of each eccentric ring, substantially as set forth.

12. A revolving rake comprising loosely mounted shafts provided with sets of depending hooks and sets of vertical teeth and means for maintaining these sets of hooks and teeth pointing in substantially the same directions as they are revolved from adjacent to the platform conveyer to the bundle receptacle, whereby the rake is adapted to elevating grain a greater distance than its own diameter, substantially as set forth.

13. A revolving rake comprising loosely mounted shafts provided with sets of depending hooks and sets of vertical teeth, and means for maintaining these hooks and teeth either in their normal positions for elevating and packing grain or inclined backward for separating the incoming grain from the bundle, substantially as set forth.

14. In a grain binding harvester, the combination with a platform conveyer and a longitudinally movable frame carrying a revolving rake, of a series of fingers carried by said longitudinally movable frame adjacent to the end of the platform conveyer and projecting under the rake, substantially as set forth.

15. In a grain binding harvester, the combination with rear and front end bars of the harvester frame, of a shaft mounted in said rear and front end bars, elevating and binding mechanism supported on said shaft, a bracket on one of the end bars of the frame, a roller in said bracket under the shaft, a bar between the end bars of the frame, a depending bracket carried by the binder frame, and a roller carried by said bracket and adapted to run on said bar, substantially as set forth.

16. In a grain binding harvester, the combination with a shaft, of central supports carried thereby, rake teeth pivotally connected to said central supports, eccentric rings also pivotally connected to said teeth, a rocker plate having rollers to run on the eccentric rings, a needle and a link connecting the rocker plate with the needle, substantially as set forth.

17. In a grain binding harvester, the combination with a shaft, and central rake supports carried thereby, of rake teeth pivotally connected to said central supports, eccentric rings also pivotally connected to the teeth, a rocker plate having rollers thereon to run on the eccentric rings, a needle shaft, a needle carried by said shaft, a link connecting said needle and rocker plate, and means carried by the needle shaft for releasing the binding mechanism, substantially as set forth.

18. In a grain binding harvester, the combination with a revolving rake comprising pivoted teeth, eccentric rings pivotally connected to said teeth, a rocker plate having rollers adapted to run on said rings, a needle bar, a link connecting the rocker plate and needle bar, a lever carried by the needle bar and provided with a hooked end, a notched lug or plate carried by a mutilated gear wheel, means for transmitting motion to said gear wheel, a yielding connection between the mutilated gear wheel and said lever, an arm projecting from said lever and carrying a roller, a trip shaft carrying a trip finger, and an arm carried by said trip shaft and adapted to engage said roller to release the locking mechanism when a bundle presses against the trip finger, substantially as set forth.

19. In a tripping mechanism, the combination with an oscillatory lever having a hooked arm, the face of said hook being curved, of a lug or plate carried by a gear wheel and having a curved edge to receive the curved edge of the hook, and a yielding connection between said lug or plate and the lever at the end opposite said hook, substantially as set forth.

20. In a locking and tripping mechanism, for self binding harvesters, the combination with a rock shaft C′, pinion 28, gear wheel 26, lever 32 mounted on rock shaft C′ and provided with a hook 33 adapted to engage a hook 34 on gear wheel 26, and a pitman 36 provided with a spring 39 yieldingly connecting arm 32 with the mutilated gear wheel 26, of a trip shaft 45 provided on its inner end with a trip finger 46 and on its outer end with an arm 44 adapted to bear against arm 48 projecting from and attached to lever 32, and a lug or roller 40 projecting from the inner face of gear wheel 26 and adapted to operate in slot 41 of the pivotally supported cam lever 42 to raise and lower said lever, and a link connecting the free end of cam lever 42 with the free end of arm 44, substantially as set forth.

21. The combination with a harvester frame, platform conveyer, and driving wheel, of a transversely adjustable elevator and packer frame, placed intermediate between the platform conveyer and driving wheel, comprising substantially as shown the front and rear standards $d$, $d$, provided with offsets or flanges 17, 17, and parts 20 and 21 projecting upward from the offsets 17, 17, and the cross rods or bars 15, $c$ and 22 connecting said standards, and a sleeve 23 projecting rearwardly from the upper end of part 20, the rear end of said sleeve being supported by means of brace 24 projecting from bar 22, and means for adjustably supporting said frame, substantially as set forth.

22. The combination with a frame, of a sectional revolving rake, each section comprising sets of pivotally supported hook shaped teeth, supported at points between their ends forming teeth at each end means for controlling the position of the teeth, and a rock shaft provided with a needle adapted to operate between the sections of the rake, substantially as set forth.

23. The combination with a platform conveyer and driving wheel, of a transversely adjustable frame placed intermediate between the platform conveyer and driving wheel, and means for supporting the frame, of a sectional revolving rake mounted in said frame adjacent to the platform conveyer, each section of the rake comprising sets of pivotally supported hook shaped teeth supported at points between their ends forming teeth at each end, means for controlling the position of the teeth, a binder table extending from the central or highest point of the rake outward over the driving wheel, a rock shaft placed beneath said binder table adjacent to the rake, and an underlying needle mounted on said rock shaft so as to lie normally between the rake sections, substantially as set forth.

24. The combination with a frame placed intermediate between the platform conveyer and driving wheel, of a revolving rake comprising sets of hook shaped teeth supported at points between their ends forming teeth at each end and means for controlling the position of the teeth, annular bands supported between the sets of teeth, and fingers attached to said frame extending outward under the rake frame adjacent to the platform conveyer, substantially as set forth.

25. The combination with a transversely adjustable frame placed intermediate between the platform conveyer and driving wheel, and means for supporting the frame, of a sectional revolving rake mounted in said frame adjacent to the platform conveyer, a binder table extending outward from the central or highest point of the rake over the driving wheel, a rock shaft provided with a needle adapted to operate between the sections of the rake, and laterally projecting strips or flanges curved inward and downward from laterally projecting parts of the binder table, to conform to the periphery of the rake for supporting the ends of grain which project beyond the rake teeth, substantially as set forth.

26. The combination with two standards extending upward and inclined outward from adjacent to the platform conveyer, and spaced apart by connecting rods, of a sectional revolving rake loosely mounted in said standards, and a rock shaft also loosely mounted in the standards adjacent to the rake and provided with an underlying needle adapted to lie normally between the two rake sections, said standards being provided with laterally projecting offsets at or near a level with the top of the rake and parts projecting upwardly from the outer ends of these offsets for supporting a binding mechanism, substantially as set forth.

In testimony whereof I have signed this specification in the presence of two subscribing witnesses.

ANDREW GARDNER.

Witnesses:
JOHN M. WOOD,
ELI CLAYTON.